Nov. 27, 1934.   R. L. DUBLIN   1,982,047
EYEGLASS AND SPECTACLE MOUNTING
Filed April 4, 1933
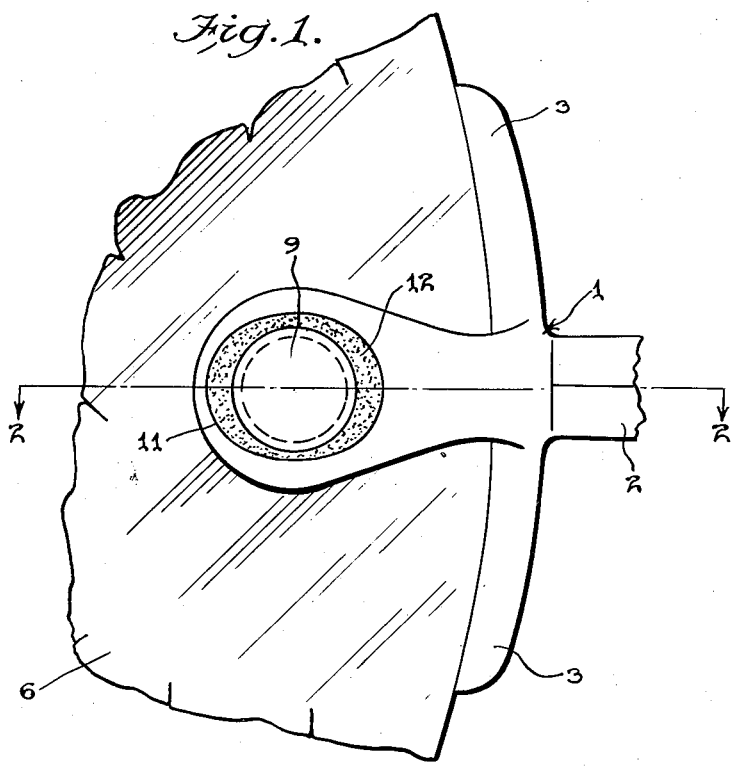
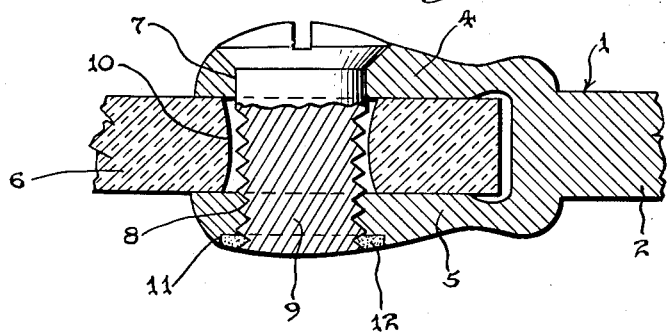
Inventor
Ralph L. Dublin,
By
Attorney Patented Nov. 27, 1934

1,982,047

UNITED STATES PATENT OFFICE 1,982,047

EYEGLASS AND SPECTACLE MOUNTING

Ralph L. Dublin, Rochester, N. Y.

Application April 4, 1933, Serial No. 664,400

4 Claims. (Cl. 88—47)

The invention relates to eye-glass and spectacle mountings.

Considerable difficulty is encountered by opticians in maintaining the glasses or lenses of eye-glasses and spectacles in tight engagement with the frame or mounting made therefor. This results from the fact that all the parts of the mounting and securing means are necessarily small, light and of a more or less yielding material and owing to the delicacy of the parts, the screws cannot be made to engage the frame or mounting as firmly as necessary.

After the straps of a rimless eye-glass or spectacle mounting are fitted to a lens and the screw is inserted, the lens, just before the screw is firmly secured, is not tight in the mounting and has considerable looseness. When the screw is brought down firmly the lens is tight in the mounting and any releasing of the screw allows the lens to become loose. In the ordinary handling and cleaning of lenses this screw becomes loose and causes the lens to become wobbly and to bend back the lugs of the mounting and increase the looseness of the lens, particularly while cleaning the same.

An object of the present invention is to provide simple, practical, efficient and inexpensive means adapted to be readily applied to various eye-glass and spectacle mountings, either rim or rimless, without necessitating any material alteration in the construction of standard fastening means or any impairment or weakening of the ordinary drilled lens and capable of firmly connecting or uniting a screw with the mounting and of effectually preventing the screw from becoming loose through the ordinary handling and cleaning of eye-glasses or spectacles whereby the lenses will be firmly maintained in accurate alignment and prevented from wobbling or becoming loose.

A further object of the invention is to enable an adhesive or plastic material to be applied to a lens mounting after a screw has been screwed down tight in the ordinary manner and to arrange the adhesive material so that it will be practically imperceptible in the use of the eyeglasses or spectacles.

It is also an object of the invention to enable a screw held by such an adhesive to be readily removed without liability of injuring either a lens or its mounting.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

Figure 1 is a rear elevation of a portion of an ordinary rimless eye-glass illustrating one embodiment of the invention.

Figure 2 is a sectional view on the line 2—2 of Figure 1.

Referring to the drawing, 1 designates the nosepiece of a rimless eye-glass or spectacle mounting including a bridge 2, lugs 3 and front and rear straps 4 and 5, which are spaced apart to receive a lens 6 in the usual manner. The outer or front strap 4 is provided with a smooth countersunk screw opening 7 and the inner or rear strap is provided with a threaded screw opening 8 arranged in alignment with the outer screw opening 7 and adapted to receive an ordinary screw 9 which passes through a drilled opening 10 in the lens which is secured between the straps in the usual standard manner. The present invention requiring no alteration in the standard means for securing a lens in its mounting and the screw threaded end portion of the screw 9 has a neat turning screw fit with the threaded portion defining the screw opening 7. However as herein appears in the construction as illustrated, the extreme end of the threaded portion of the screw extends slightly beyond the surface of the threaded portion that defines said screw opening 7.

In order to hold the screw firmly against retrograde rotation the inner or rear strap 5 is provided in its exterior surface with a substantially annular recess or counterbore 11, forming a walled pocket or cavity in the exterior of the mounting entirely surrounding the screw 9 and exposing a portion of the threads thereof and receiving a filling 12 of plastic adhesive material which cohesively unites with the screw and the mounting and firmly connects the screw and the mounting and effectually prevents the screw from becoming loose with the ordinary handling and cleaning of eye-glasses of spectacles. The substantially annular recess 11 is preferably slightly elliptical, as clearly illustrated in Figure 1 of the drawing, but the walls of the recess or cavity may be of any desired configuration and, while for the purpose of illustrating the invention, the recess or cavity 11 is shown in the drawing in the exterior surface of the inner or rear strap of the mounting, a similar recess may be formed in either or both of the straps and may be located, if desired, at either the inner or outer surface of the straps. The location of the recess or cavity 11 at the exterior of the inner or rear strap, however, is considered preferable as a single recess with its adhesive filling has been found ample to unite firmly a screw with the mounting and prevent the screw from becoming loose during ordinary handling and cleaning of eye-glasses and spectacles. Also, by locating the adhesive material in the inner or rear strap, it is practically imperceptible and is entirely concealed from view when the eye-glass or spectacles are in use. In practice, the adhesive material will be of the same color as the material of the mounting.

When it is desired to remove the lens the screw may be unscrewed by the application of proper force by means of a screw driver or the adhesive material may be removed from the cavity by a pick or other instrument or by a suitable solvent. Any suitable adhesive material may, of course, be employed. The adhesive material firmly attaches itself to the screw and to the strap or straps, filling in the recess and providing a firm and secure lock for the screw, so that it cannot become loose in the ordinary handling of the eyeglass or spectacle, and the lenses are maintained in proper position and are prevented from becoming out of alignment. The application of the adhesive material for uniting the screw and the mounting to form a lock for the screw does not in any way interfere with the standard fastening means for securing the lens in the mounting and the adhesive material may be located wholly within the mounting exteriorly thereof without liability of coming in contact with any surface of the lens.

It will be noted that the screw when in place is positioned so that the head seats in a counter bore portion at the exterior of the outer or front strap 4, that the screw passes from the seat of the counter bored portion of the front strap, thence through the opening in the lens for receiving the screw, thence into and through and slightly past a screw threaded opening in the inner or rear strap whereby the extreme end of the threaded section of the screw extends past the material defining the bottom of the cavity which is provided in the rearmost face of the rear strap. The extending or projecting screw end in effect is centrally located within that portion of the metal that defines the wall portion of said cavity or substantially annular recess as the cavital portion may be referred to.

The particular strap in which the screw head is located may be referred to as the screw head receiving strap while the strap that has an interiorly threaded opening or portion, and into, through and from which the extreme end of the threaded section of the screw passes, may be referred to as the threaded receiving strap. The threaded portion of said threaded receiving strap receives the threaded section of the screw so that the latter makes a direct or neat screw fit with the screw threaded section of the strap. Either the front strap or the rear strap can be constructed to serve as the screw head receiving strap and likewise respectively the rear strap or the front strap can be constructed so as to serve as the threaded receiving strap. The cavity in the threaded receiving strap may be provided by counter boring. This counter bore is preferably located on the exterior of said threaded receiving strap and therefore said threaded receiving strap may also be referred to as an exteriorly counter bored strap. In a plane that is parallel to the general face of the lens, to wit in a plane which extends transversely to the axis of the screw when in holding position, the walls defining the cavital portion or counter bore appears as non circular, preferably approximately elliptical, whereby any tendency of the cementitious material therein to loosen and turn is prevented.

What is claimed is:

1. A mounting of the class described having a nose piece end in which there is comprehended a set of spaced straps holding therebetween a lens, and in combination with said straps a screw that passes from a screw head receiving opening in one of said straps to and through an opening in the lens, thence into, through and beyond a screw threaded opening in the other of said straps, with which screw threaded opening the threaded section of the screw has a direct fit, said last mentioned screw threaded strap having a cavital portion at the exterior within which the projecting end of the screw is centrally located, and means providing a cementing medium seated in the cavity and extending from the threaded exterior of the screw to the peripheral wall of the cavital portion and serving to cohesively secure the screw in place in said mounting.

2. In an article of manufacture of the class described, a lens and a pronged member, the prongs of which provide spaced straps within which a portion of the lens is received, a screw that effects the securing of the lens wherein a portion of the lens is between said straps, and which screw when finally positioned extends from one of said straps, thence through an opening in said lens, thence into, through and beyond a screw threaded section in said other strap and with which said screw threaded section of the strap the threaded section of the screw has direct holding engagement, said straps having said screw threaded section also having at the exterior thereof a cavital portion into which the extreme end portion of the threaded section of the screw extends, and means provided by adhesive material seated in said cavital portion so as to engage the bottom and wall portion of the cavity and also surrounding and engaging a threaded portion of said extreme end portion and so as to provide a member that cohesively unites said screw in position in respect to said pronged member, whereby the screw is effectively prevented from becoming loose.

3. An article of manufacture as defined in and by claim 2, wherein the cavital portion is non circular in a plane approximately parallel to the general face of the lens when the latter is in position.

4. In an article of manufacture of the class described, a lens and a pronged member, the prongs of which provide spaced straps within which a portion of the lens is received, a screw that effects the securing of the lens wherein a portion of the lens is between said straps, and which screw when finally positioned extends from one of said straps thence through an opening in said lens and thence into and through a screw threaded section in said other strap and with which said screw threaded section of the strap the threaded section of the screw has direct holding engagement, one of said straps being provided in one of its faces with a cavital portion in a plane approximately parallel with the general face of the lens when the latter is in position, and means providing a cementing medium seated in the cavital portion and extending from the threads of the screw to the peripheral wall of the cavital portion and serving to cohesively secure the screw in said mounting, whereby the screw is locked against rotation and is prevented from becoming loose.

RALPH L. DUBLIN.